US006952005B2

(12) United States Patent
Doppke et al.

(10) Patent No.: US 6,952,005 B2
(45) Date of Patent: Oct. 4, 2005

(54) OPTICAL RECEIVER CIRCUIT

(75) Inventors: Harald Doppke, Mulheim an der Ruhr (DE); Detlev Theil, Dusseldorf (DE); Torsten Harms, Kempen (DE); Stefan van Waasen, Duisburg (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/818,878

(22) Filed: Apr. 5, 2004

(65) Prior Publication Data

US 2005/0133691 A1    Jun. 23, 2005

Related U.S. Application Data

(60) Provisional application No. 60/531,345, filed on Dec. 19, 2003.

(51) Int. Cl.[7] ............................................. H01L 31/00
(52) U.S. Cl. ............................. 250/214 R; 250/214 C; 357/514
(58) Field of Search ........................ 250/214 A, 214 C, 250/214 R; 257/292; 327/77, 78, 307, 514

(56) References Cited

U.S. PATENT DOCUMENTS 5,498,993 A * 3/1996 Ohtsuka et al. ............. 327/514

* cited by examiner

*Primary Examiner*—David Porta
(74) *Attorney, Agent, or Firm*—Bever, Hoffman & Harms, LLP; Patrick T. Bever

(57) ABSTRACT

Optical receiver circuit having a first, illuminable reception device for converting an optical signal into an analog electrical signal; a first preamplifier for amplifying the output signal of the first reception device; a postamplifier having a first input and a second input, the first input being supplied with the signal of the first reception device (said signal having been amplified in the first preamplifier) and the second input being supplied with a reference signal; an offset compensation circuit, which regulates the difference between the mean value of the electrical signal at the first input of the postamplifier and the reference signal at the second input of the postamplifier to a constant value; and having a signal detection device, which detects a control signal of the offset compensation circuit and carries out signal detection in a manner dependent on this signal. The invention provides signal detection in an optical receiver circuit, which manages with few additional components.

20 Claims, 1 Drawing Sheet

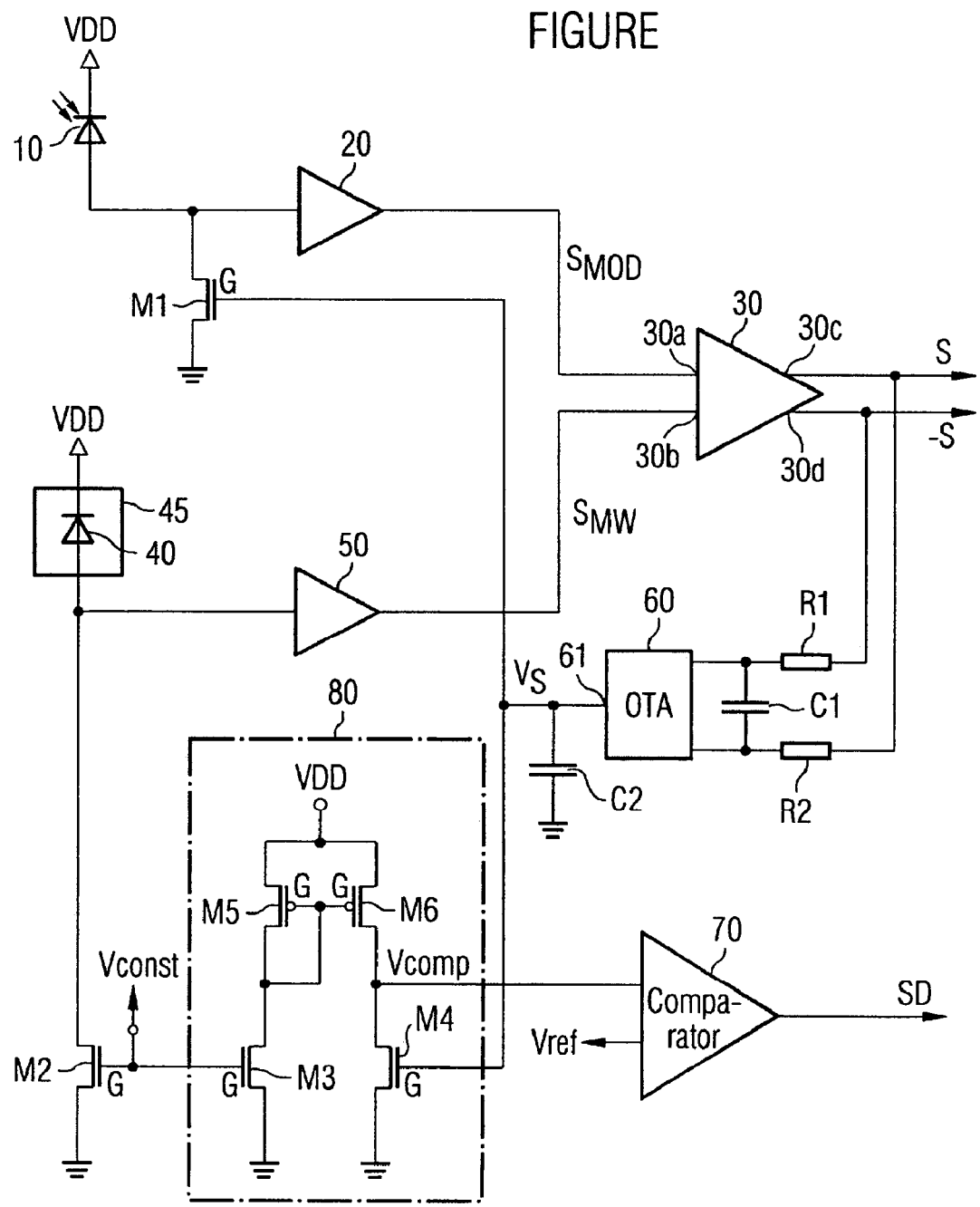
FIGURE ary parts: an analog input part, in which the optical signal is converted
OPTICAL RECEIVER CIRCUIT

RELATED APPLICATION

The present application claims priority of U.S. Patent Application Ser. No. 60/531,345 filed by Harald Doppke, Detlev Theil, Torsten Harms and Stefan van Waasen on Dec. 19, 2003.

FIELD OF THE INVENTION

The invention relates to an optical receiver circuit as used, in particular, to detect optical signals in digital optical receivers.

BACKGROUND OF THE INVENTION

For the reception and for the regeneration of optical signals after they have passed through a transmission system, digital optical receivers are known which comprise an analog input part, in which the optical signal is converted into an analog electrical signal, and a digital signal processing part, in which the analog signal is regenerated into a digital data signal having a normalized amplitude and clock information. In the analog part, the optical signal received is converted into a photocurrent by means of a photodiode and amplified in a preamplifier.

It is known practice, in digital optical receivers of this type or even in another context, to carry out signal detection (signal detect). Signal detection allows the threshold value detection of a particular optical power level at the input of the receiver. It is used to indicate the presence of a signal having a particular optical power level. This information may be used to control, for example activate or deactivate, the optical receiver and other system components. Signal detection provides a logic "signal detect" signal, which has the logic value ONE (when a signal of a particular optical power level is present) or the logic value zero (if a signal of this type is not present).

Signal detection usually works by absolute-value formation or rectification and monitoring of the peak value of the input signal and comparison thereof with a reference value. To this end, it is known practice to carry out signal detection with the aid of mixers, source and emitter followers, respectively, as rectifiers. This is disadvantageously associated with a considerable area requirement and current consumption.

SUMMARY OF THE INVENTION

The present invention provides an optical receiver circuit having signal detection, in which the receiver circuit manages with as few additional components as possible, and instead uses components which are already present for the purpose of signal detection and, is correspondingly distinguished by a low area requirement and current consumption.

In one embodiment, the present invention provides an optical receiver circuit having a first, illuminable reception device for converting an optical signal into an analog electrical signal, a first preamplifier for amplifying the output signal of the first reception device and a postamplifier having a first input and a second input, the first input being supplied with the signal of the first reception device (said signal having been amplified in the first preamplifier) and the second input being supplied with a reference signal. An offset compensation circuit is provided, which regulates the difference between the mean value of the electrical signal at the first input of the postamplifier and the reference signal at the second input of the postamplifier to a constant value, in particular to zero. The receiver circuit furthermore has a signal detection device, which detects a control signal of the offset compensation circuit and carries out signal detection in a manner dependent on this signal.

Since, in optical systems, the signal at the input of the receiver is in most cases single-phase (single-ended) but the design is usually differential for reasons of susceptibility to interference and stability, it is necessary, at a suitable point in the linear operating range of the optical receiver, to carry out single-ended to differential conversion. To this end, the DC offset contained in the data stream signal provided by the first preamplifier must be extracted from said data stream signal. This is effected by means of an offset compensation circuit.

The present invention, then, uses an offset compensation circuit of this type for signal detection as well. In this case, it is possible, by means of the offset compensation circuit, to detect the level of the input signal since the offset contains the signal swing of the input signal, except for the error of the finite extinction rate. However, the error of the finite extinction rate is negligible in most systems on account of the minimum requirement imposed on the extinction rate (>10 dB) and the requisite precision of the signal detect (>10 dB fluctuation range).

In one preferred refinement, the signal detection device has a comparator having a first and a second input, a signal, which is dependent on the control signal of the offset compensation circuit, being present at the first input of the comparator and a signal detection reference value being present at the second input. The comparator compares these signals and, in a manner dependent on the comparison, indicates the presence of signal detection. In particular, the comparator provides a particular voltage level, which indicates logically a "one" or a "zero" and codes a "signal detect".

The offset compensation circuit preferably has an integrating element having a capacitance, the voltage of said element, on the one hand, representing a manipulated variable of the offset compensation regulation and, on the other hand, being detected by the signal detection device. To this end, the signal detection device preferably has circuit means which, in a manner dependent on the voltage of the integrating element, generate a voltage value, which is supplied to the first input of the comparator. The voltage of the integrating element is thus used for signal detection.

The circuit means mentioned may, for example, have a mirror circuit, the voltage of the integrating element being supplied, as control voltage, to one of the transistors of the mirror circuit. In particular, the mirror circuit may have:
a first transistor, the control terminal of which has a constant voltage applied to it,
a second transistor, the control terminal of which has the voltage of the integrating element applied to it,
a current mirror comprising a third and a fourth transistor with a reference current and a control current,
the first and third transistor and the second and fourth transistor being connected in series, and
a signal, which is tapped off between the second and the fourth transistor, being supplied to the first input of the comparator.

In this case, the reference current of the current mirror is formed by the current generated by the first transistor and flows through the third transistor. The control current flows through the fourth transistor and, in addition, tries to also flow through the second transistor. The extent to which this is achieved depends on the control voltage of the second transistor, said voltage being predetermined by the voltage of the integrating element. When a useful signal is present at the first preamplifier, the voltage at the integrating element and thus at the control terminal of the second transistor rises. The potential between the second and the fourth transistor thus also rises and this potential is supplied to the comparator. A "signal detect" is present provided that the potential supplied is greater than the reference value.

In one preferred development, the optical receiver circuit furthermore has a second, nonilluminable reception device, which simulates the electrical behavior of the first reception device in the illumination-free case, and also a second preamplifier for amplifying the output signal of the second reception device. In this case, the output of the second preamplifier is connected to the second input of the postamplifier and the output signal of the second preamplifier represents the reference value of the postamplifier.

A refinement of this type makes it possible to largely suppress interference signals which stem, for example, from supply voltage fluctuations. A reference value is provided at the output of the second preamplifier, the preamplified data stream signal being compared with said reference value in the postamplifier.

In one preferred refinement, the offset compensation circuit regulates a current source of the first preamplifier, the operating point at the input of the preamplifier and thus also the mean signal level at the output of the preamplifier being set by means of said regulation. In principle, however, it is likewise possible, via the offset compensation circuit, to regulate the magnitude of the reference value, which is preferably provided by the second reception device and the second preamplifier.

In this case, regulation is effected in such a manner that the reference value at the postamplifier has a signal value which is precisely 50% of the signal swing of the signal at the other input of the postamplifier. This can be achieved, on the one hand, by regulating the sampling threshold (defined by the reference signal) in the case of a firmly predetermined offset of the data stream signal. It is likewise possible to regulate the offset of the data stream signal in the case of a constant reference signal. It is also possible to combine regulation operations of this type. The crucial factor is that the signal is sampled at 50% of the amplitude. For this case, the postamplifier provides, at its output, an offset-corrected output signal, which corresponds to the optical signal of the first reception device, and an output signal which is inverted with respect to the offset-corrected output signal. The downstream components are then driven in a differential manner.

The first reception device and the second reception device are preferably monolithically integrated on a chip. In this case, the first preamplifier and the second preamplifier are of identical design.

BRIEF DESCRIPTION OF THE DRAWINGS

The invention is explained in more detail below using an exemplary embodiment and with reference to the single FIGURE. The FIGURE shows an optical receiver circuit of a digital optical receiver.

DESCRIPTION OF A PREFERRED
EXEMPLARY EMBODIMENT

The receiver circuit has a first optoelectronic transducer 10 in the form of a photodiode, which converts an optical information signal into an electrical signal. The electrical signal is amplified in an input amplifier or preamplifier 20 and supplied to one input 30a of a postamplifier 30, which is a differential amplifier. The preamplifier 20 is preferably a transimpedance amplifier comprising a voltage amplifier and a negative feedback resistor (not illustrated in any more detail).

At the input of the preamplifier 20, a constant current of a regulatable current source, which is provided by a field effect transistor M1, is superposed on the essentially rectangular-waveform output signal of the photodiode 10. The current source M1 is regulated via the gate voltage present at the transistor M1. Instead of a field effect transistor, a bipolar transistor may, however, in principle also be used at this point and even otherwise in the circuit.

The current source M1 feeds a current into the preamplifier 20 and thereby provides a suitable offset at the input of the preamplifier 20.

Further circuit elements (not illustrated) may in addition be used to vary the negative feedback resistor of the preamplifier 20 and, as a result, to set the amplitude of the output signal of the preamplifier 20.

A photodiode 40 is furthermore provided, which, however, is covered by a screen 45 or the like. Said photodiode is a "dummy photodiode", which electrically simulates the electrical behavior of the "seeing" photodiode 10 in the illumination-free case. In this manner, radiofrequency interference can be suppressed to the greatest possible extent.

The photocurrent of the nonilluminable photodiode 40 is supplied to a further input amplifier or preamplifier 50. The input level at the input of the second preamplifier 50 is set via a further current source M2. The second current source M2 is likewise provided by a field effect transistor M2. A fixed voltage $V_{CONST}$ is applied to the gate voltage of the transistor M2, with the result that the current source M2 provides a fixed current.

The output signal of the first preamplifier 20 is supplied to one input 30a of the postamplifier 30. The output signal of the second preamplifier 50 is supplied to the other input 30b of the postamplifier. Since no optical signal is detected by the nonilluminable photodiode 40, the signal $S_{MW}$ present at the input 30b has a constant value, apart from interference frequencies. In contrast, the signal $S_{MOD}$ at the output of the first preamplifier 20 represents an information signal modulated in rectangular-waveform fashion.

The intention, then, for the offset correction of the modulated signal $S_{MOD}$, which has been emitted by the photodiode 10 and amplified in the preamplifier 20, is to seek to feed a "correction signal" $S_{MW}$ into the lower input 30b of the postamplifier 30, the magnitude of said correction signal representing precisely 50% of the signal swing of the information signal $S_{MOD}$ at the other input 30a of the postamplifier. For this case, the postamplifier 30 provides, at its output, an offset-corrected output signal corresponding to the optical signal of the photodiode 10. In this case, provision is made for the postamplifier 30 to provide, at two outputs 30c, 30d, an output signal S and an output signal −S, which is inverted with respect to the latter. The downstream components are then driven in a differential manner.

In order to ensure that the level $S_{MW}$ at the output of the preamplifier 50 is exactly equal to the mean value of the signal swing of the data stream signal $S_{MOD}$, regulation is effected by means of an offset compensation circuit. To this end, the differential output signal S, −S is supplied to an operational amplifier 60 (having a current output) via a filter comprising two resistors R1, R2 and a first capacitor C1. The output 61 of the operational amplifier 60 forms, together with a second capacitor C2, an integrating element. In this case, a current is applied to the capacitance C2 via the operational amplifier, said current, at the clock rate of the information signal detected by the photodiode 10, resulting in charging and discharging of the capacitor C2.

On account of the integrating action, however, the voltage present at the capacitance C2 follows the clock rate of the information signal only slowly. Rather, the voltage rises slowly or falls slowly depending on whether an information signal is present or not. Provided that the signals S, –S which are supplied to the input of the operational amplifier 60 are exactly the inverse of one another, the capacitance C2 is not discharged or charged and a stable state is present. In this case, the system is in a steady state. If the signals S, –S are not exactly the inverse of one another, the capacitance C2 is slowly discharged or charged.

The voltage present at the capacitance C2 provides a control voltage $V_S$ for the first current source M1. In this manner, the system is adjusted until the current provided by the current source M1 has precisely a mean level equal to the reference value present at the second input 30b of the postamplifier 30.

The system is thus adjusted when the difference between the mean value of the electrical signal $S_{MOD}$ at the first input 30a of the postamplifier 30 and the reference signal $S_{MW}$ at the second input 30b of the postamplifier 30 has been regulated to a constant value, this value preferably being equal to zero. The ideal comparison value for the preamplified data stream signal is then present.

It is pointed out in this case that, in principle, the current source M2 could also be regulated instead of the current source M1. Fundamental differences would not arise in this case.

All in all, the mean value of the data signal is thus lowered using offset compensation. This offset compensation is now simultaneously used to carry out signal detection.

In accordance with the concept of the present invention, the control voltage provided by the capacitance C2 is not only used for offset compensation but additionally serves as input signal for a circuit 80 comprising field effect transistors M3, M4, M5, M6, which generates a voltage comparison value $V_{COMP}$ for a comparator 70.

The comparator 70 compares the voltage comparison value $V_{COMP}$ with a fixed reference signal $V_{REF}$. If the signal VCOmp is greater than the reference signal VREF, signal detection is present and a logic signal SD (Signal Detect) having the logic value "one" is output at the output of the comparator 70. If, in contrast, the comparison voltage $V_{COMP}$ is less than the reference voltage $V_{REF}$, a sufficiently large signal is not present and the logic signal SD is at logic "zero".

In the exemplary embodiment illustrated, the circuit 80 is in the form of a current mirror circuit. It has a first n-channel FET transistor (field effect transistor) M3. The fixed voltage $V_{CONST}$ is applied to the gate terminal of the first transistor M3, said voltage also being present at the gate terminal of the transistor M2. The source terminal is connected to ground. The actual current mirror is formed from two p-channel transistors M5, M6, the gate terminal and the drain terminal of one transistor M5 being connected to the drain terminal of the transistor M3. The source terminal of the transistor M5 is connected to a positive supply voltage $V_{DD}$—if necessary via a resistor. The gate terminals of the transistors M5, M6 are connected to one another. The source terminal of the further transistor M6 is likewise connected to the positive supply voltage $V_{DD}$—if necessary via a further resistor.

An n-channel FET transistor M4, which is connected in series with the transistor M6, is furthermore provided. The source terminal of the transistor M4 is connected to ground and the drain terminal is connected to the drain terminal of the transistor M6. The voltage $V_S$ at the capacitance C2 of the integrating element of the offset compensation circuit is applied to the gate terminal of the transistor M4.

The method of operation of the current mirror is as follows. The current generated by the transistor M3 represents a reference current of the current mirror 80, said reference current flowing through the transistor M5. The current mirror, then, generates a control current, which is related to the reference current in a particular manner and flows through the transistor M6 and, in addition, tries to flow through the transistor M4 as well. The extent to which this is achieved depends on the gate voltage of the transistor M4, said voltage being determined by the voltage of the integrating element C2.

A voltage $V_{COMP}$ is tapped off between the transistors M4 and M6 and supplied to one input of the comparator 70. The voltage $V_{COMP}$ varies depending on how large the voltage $V_S$ at the gate of the capacitance C2 is. If a low voltage is present at the capacitance C2, the voltage value $V_{COMP}$, which has been tapped off, is also low. When the voltage at the capacitance C2 rises, the voltage value $V_{COMP}$ also rises. For this case, the current through the transistor M6 can thus flow away through the transistor M4 only to a reduced extent. The voltage at the capacitance C2 rises, however, precisely when a signal is detected by the illuminated photodiode 10 and is present at the preamplifier 20. The voltage $V_{COMP}$, which rises with the voltage at the capacitance C2, can thus be used for signal detection.

When a useful signal is present at the first preamplifier 20, the voltage at the integrating element C2 and thus at the gate terminal of the transistor M4 therefore rises. This means that the potential between the transistors M4, M6 also rises and this potential is supplied to the comparator 70.

The components used are preferably implemented using CMOS technology.

The configuration of the invention is not restricted to the exemplary embodiments described above. As already explained, instead of the current source M1, the current source M2 may, for example, likewise be regulated by the offset compensation circuit. The mirror circuit could then be coupled, for example, to the transistor M1, which, for this case, would have a fixed gate voltage applied to it. Other refinements may provide for the offset voltage, which is provided by the capacitance C2, to be directly supplied to the comparator 70. The comparator 70 then compares this offset voltage with a reference voltage.

We claim:

1. An optical receiver circuit comprising:
   a first, illuminable reception device for converting an optical signal into an analog electrical signal;
   a first preamplifier for amplifying the analog electrical signal output from the first reception device;
   a postamplifier having a first input and a second input, the first input being supplied with the amplified analog electrical signal, and the second input being supplied with a reference signal,
   an offset compensation circuit for regulating a difference between a mean value of the amplified analog electrical signal supplied to the first input of the postamplifier and the reference signal supplied to the second input of the postamplifier to a constant value, and a signal detection devicefor detecting a control signal generated by the offset compensation circuit, and for generating a logic signal in responding to the control signal.

2. The optical receiver circuit as claimed in claim 1, wherein the signal detection device comprises a comparator having a first input and a second input,
wherein a first signal, which is dependent on the control signal of the offset compensation circuit, is present at the first input of the comparator,
wherein a signal detection reference value is present at the second input, and
wherein the comparator includes means for comparing the first signal and the signal detection reference value and, in a manner dependent on the comparison, indicating the presence of signal detection.

3. The optical receiver circuit as claimed in claim 1, wherein the offset compensation circuit comprises an integrating element having a capacitance, wherein a voltage stored on said element both represents a manipulated variable of the offset compensation circuit and, is detected by the signal detection device.

4. The optical receiver circuit as claimed in claim 2, wherein the signal detection device comprises circuit means for, in a manner dependent on the voltage of the integrating element, generating a voltage value, which is supplied to the first input of the comparator.

5. The optical receiver circuit as claimed in claim 4, wherein the circuit means comprises a mirror circuit, and wherein the voltage of the integrating element represents the control voltage of one transistor of the mirror circuit.

6. The optical receiver circuit as claimed in claim 5, wherein the mirror circuit comprises:
a first transistor having a control terminal connected to receive a constant voltage,
a second transistor having a control terminal connected to receive the voltage of the integrating element, and
a current mirror comprising a third and a fourth transistor with a reference current and a control current,
wherein the reference current of the current mirror is formed by a current generated by the first transistor,
wherein the first transistor and the third transistor are connected in series, and the second transistor and the fourth transistor are connected in series, and
wherein a signal, which is tapped off between the second and the fourth transistor, is supplied to the first input of the comparator.

7. The optical receiver circuit as claimed in claim 3, wherein the voltage of the integrating element regulates a regulatable current source of the first preamplifier.

8. The optical receiver circuit as claimed in claim 1, provision further comprising:
a second, nonilluminable reception devicefor simulating the electrical behavior of the first reception device in the illumination-free case, and
a second preamplifier for amplifying an output signal of the second reception device,
wherein the output of the second preamplifier is connected to the second input of the postamplifier.

9. The optical receiver circuit as claimed in claim 8, wherein the first reception device and the second reception device are monolithically integrated on a chip.

10. The optical receiver circuit as claimed in claim 8, wherein the first preamplifier and the second preamplifier are identical.

11. An optical receiver circuit comprising:
optical information conversion means for receiving an optical signal, and for generating a data stream signal in response to the optical signal;
reference means for generating a reference signal;
control signal generation means for generating a control signal in response to the data stream signal and the reference signal, and for transmitting the control voltage to one of the optical information conversion means and the reference means, wherein the control signal is generated such that a difference between a mean value of the data stream value generated by the optical information conversion means and the reference signal generated by the reference means is regulated to a constant value; and
detection means for detecting a presence of the optical signal in response to the control signal.

12. The optical receiver circuit as claimed in claim 11, wherein the optical information conversion means comprises:
a first light reception device having an input terminal for receiving the optical signal, wherein the first light reception device generates an analog electrical signal on an output terminal in response to the optical signal;
a first preamplifier having an input terminal connected to the output terminal of the first light reception device; and
a first regulatable current source connected between the output terminal of the light reception device and the input terminal of the preamplifier.

13. The optical receiver circuit as claimed in claim 12, wherein the first regulatable current source is controlled by the control signal to feed an offset current to the input terminal of the first preamplifier.

14. The optical receiver circuit as claimed in claim 12, wherein the reference means comprises:
a second light reception device for generating a photocurrent on an output terminal;
a second preamplifier having an input terminal connected to the output terminal of the second light reception device; and
a second regulatable current source connected between the output terminal of the second light reception device and the input terminal of the second preamplifier.

15. The optical receiver circuit as claimed in claim 14, wherein the first regulatable current source is controlled by the control signal to feed an offset current to the input terminal of the first preamplifier, and
wherein the second regulatable current source is controlled by a fixed voltage.

16. The optical receiver circuit as claimed in claim 11, wherein the control signal generation means comprises:
a differential amplifier having a first input terminal connected to receive the data stream signal, a second input terminal connected to receive the reference signal, and first and second output terminals for transmitting differential offset-corrected output signals generated in response to a comparison of the data stream signal and the reference signal; and
an offset compensation circuit comprising:
an operational amplifier having first and second input terminals connected to receive the offset-corrected output signals via a filter; and
a capacitor connected to an output terminal of the operational amplifier such that the operational amplifier and the capacitor form an integrator, wherein the control signal is generated at the output terminal of the operational amplifier.

17. The optical receiver circuit as claimed in claim 16, wherein the detection means comprises:
- a current mirror for generating a voltage comparison value in response to the control signal; and
- a comparator for comparing the voltage comparison value with a fixed reference voltage, and for generating a logic signal when the voltage comparison value is greater than the reference voltage.

18. An optical receiver circuit comprising:
- a first reception device for converting an optical signal into an analog electric signal;
- a first preamplifier having an input terminal connected to an output terminal of the first reception device;
- a first regulatable current source connected between the output terminal of the light reception device and the input terminal of the preamplifier;
- a second light reception device for generating a reference photocurrent on an output terminal;
- a second preamplifier having an input terminal connected to the output terminal of the second light reception device;
- a second regulatable current source connected between the output terminal of the second light reception device and the input terminal of the second preamplifier;
- a differential amplifier having a first input terminal connected to an output terminal of the first preamplifier, a second input terminal connected to an output terminal of the second preamplifier, and first and second output terminals for transmitting differential offset-corrected output signals generated in response to a comparison of signals received on the first and second input terminals;
- an offset compensation circuit including:
  - an operational amplifier having first and second input terminals connected to receive the offset-corrected output signals via a filter, and
  - a capacitor connected to an output terminal of the operational amplifier such that the operational amplifier and the capacitor form an integrator,
- wherein a control signal generated at an output terminal of the operational amplifier is transmitted to one of the first regulatable current source and the second regulatable current source, and
- wherein the optical receiver circuit further comprises an optical signal detection circuit including:
  - a current mirror connected to the output terminal of the operation amplifier for generating a voltage comparison value in response to the control signal, and
- a comparator for comparing the voltage comparison value with a fixed reference voltage, and for generating a logic signal when the voltage comparison value is greater than the reference voltage.

19. The optical receiver circuit as claimed in claim 18, wherein the first regulatable current source is controlled by the control signal to feed an offset current to the input terminal of the first preamplifier, and wherein the second regulatable current source is controlled by a fixed voltage.

20. The optical receiver circuit as claimed in claim 18, wherein the second regulatable current source is controlled by the control signal to feed an offset current to the input terminal of the second preamplifier, and wherein the first regulatable current source is controlled by a fixed voltage.

* * * * *